(12) United States Patent
Durrant et al.

(10) Patent No.: US 8,244,084 B2
(45) Date of Patent: Aug. 14, 2012

(54) EXPANDED BEAM, SINGLE FIBER, FIBER OPTIC CONNECTOR

(75) Inventors: Richard C. E. Durrant, Algonquin, IL (US); Mark Waldron, Poplar Grove, IL (US)

(73) Assignee: Stratos International, Inc., Bannockburn, IL (US)

( * ) Notice: Subject to any disclaimer, the term of this patent is extended or adjusted under 35 U.S.C. 154(b) by 0 days.

(21) Appl. No.: 12/660,857

(22) Filed: Mar. 5, 2010

(65) Prior Publication Data

US 2010/0166372 A1 Jul. 1, 2010

Related U.S. Application Data

(62) Division of application No. 12/218,807, filed on Jul. 8, 2008, which is a division of application No. 11/508,658, filed on Aug. 23, 2006, now Pat. No. 7,460,750.

(51) Int. Cl.
  *G02B 6/32* (2006.01)
  *G02B 6/36* (2006.01)
  *G02B 6/26* (2006.01)
(52) U.S. Cl. ............................ 385/35; 385/74; 385/52
(58) Field of Classification Search .................. 385/74, 385/35, 52
See application file for complete search history.

(56) References Cited

U.S. PATENT DOCUMENTS

| | | | | |
|---|---|---|---|---|
| 3,622,743 A * | 11/1971 | Muncheryan | ............ | 219/121.63 |
| 4,290,667 A * | 9/1981 | Chown | ............ | 385/33 |
| 4,378,954 A * | 4/1983 | Baker | ............ | 385/80 |
| 4,753,510 A * | 6/1988 | Sezerman | ............ | 385/61 |
| 4,781,431 A * | 11/1988 | Wesson et al. | ............ | 385/79 |
| 4,799,759 A * | 1/1989 | Balyasny | ............ | 385/66 |
| 4,889,399 A * | 12/1989 | Mariani et al. | ............ | 385/35 |
| 4,889,406 A * | 12/1989 | Sezerman | ............ | 385/35 |
| 5,097,524 A * | 3/1992 | Wasserman et al. | ............ | 385/73 |
| 5,247,595 A * | 9/1993 | Foldi | ............ | 385/78 |
| 5,400,429 A * | 3/1995 | Ames et al. | ............ | 385/147 |
| 5,459,805 A * | 10/1995 | Foster | ............ | 385/74 |
| 5,481,634 A * | 1/1996 | Anderson et al. | ............ | 385/76 |
| 5,528,407 A * | 6/1996 | Nakata et al. | ............ | 398/136 |
| 5,537,503 A * | 7/1996 | Tojo et al. | ............ | 385/79 |
| 5,642,450 A * | 6/1997 | Oda | ............ | 385/60 |
| 5,778,124 A | 7/1998 | Nedstedt | | |
| 5,812,717 A * | 9/1998 | Gilliland | ............ | 385/93 |
| 5,815,623 A * | 9/1998 | Gilliland et al. | ............ | 385/93 |
| 5,898,807 A * | 4/1999 | Welsh | ............ | 385/56 |
| 5,937,123 A * | 8/1999 | Frelier | ............ | 385/79 |
| 6,035,664 A * | 3/2000 | Hashizume | ............ | 65/36 |
| 6,120,191 A * | 9/2000 | Asakura et al. | ............ | 385/93 |
| 6,123,465 A * | 9/2000 | Hashizume | ............ | 385/93 |
| 6,263,133 B1 * | 7/2001 | Hamm | ............ | 385/33 |
| 6,283,644 B1 * | 9/2001 | Gilliland et al. | ............ | 385/93 |
| 6,349,160 B2 * | 2/2002 | Tsien et al. | ............ | 385/35 |
| 6,419,405 B1 * | 7/2002 | Boscha | ............ | 385/93 |
| 6,550,983 B1 * | 4/2003 | Gilliland et al. | ............ | 385/93 |
| 6,736,547 B2 | 5/2004 | Stevens et al. | | |

(Continued)

*Primary Examiner* — K. Cyrus Kianni
(74) *Attorney, Agent, or Firm* — Karl D. Kovach

(57) ABSTRACT

The device includes a body, a lens holder, a lens, a ferrule, a ferrule holder, an optical cable holder, a snap ring, and a spring. The lens holder retains the lens, and the lens holder accommodates the ferrule. The ferrule holder is mounted to the body. The spring is mounted between a spring seat of the ferrule holder and a spring seat of the optical cable holder. The snap ring is mounted to the optical cable holder so as to retain the optical cable holder to the body.

1 Claim, 8 Drawing Sheets

U.S. PATENT DOCUMENTS

| | | |
|---|---|---|
| 6,816,300 B2 * | 11/2004 | Shirai et al. ............... 359/280 |
| 6,944,377 B2 * | 9/2005 | Umebayshi et al. ........... 385/49 |
| 7,031,567 B2 | 4/2006 | Grinderslev et al. |
| 7,048,449 B2 | 5/2006 | Frojdh et al. |
| 7,104,701 B1 | 9/2006 | Durrant et al. |
| 7,228,033 B2 * | 6/2007 | Bhagavatula et al. ......... 385/35 |
| 7,350,981 B2 | 4/2008 | Durrant et al. |
| 2002/0136504 A1 * | 9/2002 | Boscha ...................... 385/91 |
| 2003/0081897 A1 * | 5/2003 | Itoh et al. ................... 385/34 |
| 2004/0022487 A1 * | 2/2004 | Nagasaka et al. ............ 385/31 |
| 2007/0172179 A1 * | 7/2007 | Billman et al. .............. 385/99 |
| 2007/0263959 A1 | 11/2007 | Durrant et al. |
| 2008/0050073 A1 * | 2/2008 | Kadar-Kallen et al. ....... 385/79 |

* cited by examiner

EXPANDED BEAM, SINGLE FIBER, FIBER OPTIC CONNECTOR

This is a divisional application of U.S. patent application Ser. No. 12/218,807, filed Jul. 18, 2008, which is a divisional application of U.S. patent application Ser. No. 11/508,658, filed Aug. 23, 2006, now U.S. Pat. No. 7,460,750. U.S. patent application Ser. Nos. 11/508,658, and 12/218,807 are both hereby incorporated herein by reference. This divisional application claims the priority of U.S. patent application Ser. Nos. 11/508,658, and 12/218,807.

BACKGROUND OF THE INVENTION

1. Field of the Invention

The present invention pertains to fiber optic connectors. The invention more particularly concerns a fiber optic connector which enables a user to replace a single fiber, physical contact, fiber optic connector with a single fiber, expanded beam, fiber optic connector.

2. Discussion of the Background

Fiber optic connectors and cables are known in the art. Typically, a fiber optic cable is terminated at each end by a respective fiber optic connector. At least two categories of fiber optic connectors exist and include physical contact connectors and expanded beam connectors. In practice, a fiber optic cable terminated with physical contact connectors will only connect to other fiber optic cables which are also terminated with physical contact connectors. Likewise, in practice, a fiber optic cable terminated with expanded beam connectors will only connect to other fiber optic cables which are also terminated with expanded beam connectors.

Physical contact connectors are characterized as such since one end of a ferrule of a first fiber optic connector physically contacts one end of a ferrule of a second fiber optic connector. Light exiting the core of the optical fiber held within the ferrule of the first fiber optic connector is then immediately introduced into the core of the optical fiber held within the ferrule of the second fiber optic connector. If the two cores are misaligned by more than a whole number of diameters of the core of the optical fiber, then most of the optical power is not exchanged from the core of the first fiber optic connector to the core of the second fiber optic connector. If a piece of debris is caught between the core of the first fiber optic connector and the core of the second fiber optic connector, then it is probable that no optical power will be exchanged from the core of the first fiber optic connector to the core of the second fiber optic connector, assuming that the debris has a size which is approximately the same size or larger than the size of the core of one of the optical fibers. Examples of physical contact connectors are set forth in U.S. Pat. Nos. 5,481,634, and 6,234,683. 5,481,634, and 6,234,683 are hereby incorporated herein by reference. Over time, the industry has utilized many physical contact, single fiber, fiber optic connectors as standards or styles, such as the LC, FC, ST, and SC fiber optic connectors.

FIG. 1 is a perspective view of one type of physical contact, single fiber, fiber optic connector 10. The fiber optic connector 10 includes a ferrule 12. Also shown is an optical cable 16. The fiber optic connector 10 generally conforms to the LC-style fiber optic connector. The ferrule 12 conforming to the LC-style has an outside diameter of approximately 1.25 millimeters. FIG. 2 is an exploded, perspective view of the fiber optic connector 10 of FIG. 1. Further shown in FIG. 2 is the optical fiber 14 of the optical cable 16. Also, the ferrule 12 is more clearly shown. FIG. 3 is a partial cross-sectional side view of two fiber optic connectors 10, 20, and two receptacles 18, 19. Fiber optic connector 10 is shown in partial cross-section, but the ferrule 12 is shown in side view. The other fiber optic connector 20 and the two receptacles 18, 19 are shown in cross-section. Receptacle 18 is attached to receptacle 19. Each receptacle 18, 19 is adapted to receive of fiber optic connector that conforms to the LC-style. Also shown is the physical contact between the ferrule 12 of the one fiber optic connector 10 and the ferrule 22 of the other fiber optic connector 20.

FIG. 4 is a perspective view of three different types or styles of physical contact, single fiber, fiber optic connectors. A flat panel 24 contains three openings. The first opening is a receptacle 26 which accommodates two SC-type fiber optic connectors 32, 33, the second opening is a receptacle 28 which accommodates two FC-style fiber optic connectors 34 35, and the third opening is a receptacle 30 which accommodates two ST-style fiber optic connectors 36, 37. The ferrules of the fiber optic connectors 32, 33, 34, 35, 36, 37 have an outside diameter of approximately 2.5 millimeters. FIGS. 1, 2, 3, and 4 are illustrations derived from figures found U.S. Patent No. 5,481,634.

Expanded beam connectors are characterized as such since the optical fiber of the fiber optic cable is mated with a lens, typically a ball lens. The expanded beam fiber optic connector holds the terminated end of the optical fiber adjacent to the lens. When optical power exits the core of the optical fiber, the optical power then enters the lens, and then eventually exits the lens. The lens causes the optical power, or light, to diverge or expand before the optical power exits the fiber optic connector. If a second expanded beam fiber optic connector is attached to the first expanded beam fiber optic connector, then, after the optical power exits the first expanded beam fiber optic connector in the expanded state, the optical power will enter the second expanded beam fiber optic connector. The optical power will enter the lens of the second expanded beam fiber optic connector and then exit the lens. The lens of the second expanded beam fiber optic connector causes the optical power to converge. The focal point of the lens of the second expanded beam fiber optic connector is centered at the core of the optical fiber of the second fiber optic cable so that substantially all of the optical power exiting the lens enters the optical fiber. If the two cores are misaligned by less than a whole number of diameters of the core of the optical fiber, then most of the optical power is exchanged from the core of the first fiber optic connector to the core of the second fiber optic connector. If a piece of debris is caught between the lens of the first fiber optic connector and the lens of the second fiber optic connector, then it is probable that some of the optical power will be exchanged from the core of the first fiber optic connector to the core of the second fiber optic connector, assuming that the debris has a size which is approximately the same size or larger than the size of the core of one of the optical fibers but is smaller than the diameter of the expanded beam. Examples of expanded beam connectors are set forth in U.S. Pat. No. 5,247,595. U.S. Pat. No. 5,247,595 is hereby incorporated herein by reference.

FIG. 5 is a cross-sectional side view of an expanded beam connector 40 that includes an optical fiber 41 and a lens 42. FIG. 6 is a cross-section side view of two expanded beam connectors 40, 43 which are readied for optical communication with one another. FIGS. 5, and 6 are illustrations derived from figures found U.S. Pat. No. 5,247,595.

Accordingly, there is a need for a device which incorporates the advantages of the expanded beam fiber optic connector into the well received package size of the known single fiber, physical contact, fiber optic connectors.

SUMMARY OF THE INVENTION

It is an object of the invention to provide a device that includes expanded beam technology and which is mountable to an industrial standard or existing receptacle or adapter where the receptacle or adapter was originally designed to accommodate a physical contact, single fiber, fiber optic connector.

It is another object of the invention to provide a device that includes expanded beam technology and is mountable or intermateable with a receptacle where the receptacle was originally designed to accommodate a LC-style fiber optic connector.

It is another object of the invention to provide a device that includes expanded beam technology and is mountable or intermateable with a receptacle where the receptacle was originally designed to accommodate a SC-style fiber optic connector.

It is another object of the invention to provide a device that includes expanded beam technology and is mountable or intermateable with a receptacle where the receptacle was originally designed to accommodate a FC-style fiber optic connector.

It is another object of the invention to provide a device that includes expanded beam technology and is mountable or intermateable with a receptacle where the receptacle was originally designed to accommodate a ST-style fiber optic connector.

In one form of the invention the device includes a lens holder, a lens, and a ferrule. The lens holder retains the lens, and the lens holder accommodates the ferrule. The lens is in optical communication with an optical fiber retained in the ferrule. The lens holder has an outside diameter that is substantially the same as the outside diameter of a ferrule of a physical contact, single fiber, fiber optic connector, such as one of an LC, SC, FC, and ST style or standard fiber optic connectors.

In a second form of the invention the device or connector includes a lens holder, a lens, a ferrule holder, a ferrule, a body, an epoxy material, an optical cable holder, a spring, and a snap ring. The lens holder retains the lens, and the lens holder accommodates the ferrule. The ferrule holder retains the ferrule. The lens holder is mounted to the ferrule holder by way of the epoxy material at an interface between an outside diameter of the ferrule holder and an inside diameter of the third aperture of the lens holder. The spring is retained between the ferrule holder and the optical cable holder. A portion of the ferrule holder, a portion of the optical cable holder, and the spring are mounted within the body. The optical cable holder is retained, essentially in an unmovable manner, to the body by a snap ring. The lens is in optical communication with an optical fiber retained in the ferrule. When the lens holder makes physical contact with a lens holder of another fiber optic connector, the lens holder, and ferrule holder translate, thus compressing the spring against the optical cable holder. In turn the optical cable holder reacts the force into the body. Once the spring is compressed to some degree, the lens holder and the ferrule holder can accommodate some amount of misalignment. The lens holder has an outside diameter that is substantially the same as the outside diameter of a ferrule of a physical contact, single fiber, fiber optic connector, such as one of an LC, SC, FC, and ST style or standard fiber optic connectors.

In a third form of the invention the device includes a lens holder, a lens, and a ferrule. The lens holder retains the lens, and the lens holder accommodates the ferrule. The lens is in optical communication with an optical fiber retained in the ferrule. The lens holder has an outside diameter that is substantially equal to 1.25 millimeters.

In a fourth form of the invention the device includes a lens holder, a lens, and a ferrule. The lens holder retains the lens, and the lens holder accommodates the ferrule. The lens is in optical communication with an optical fiber retained in the ferrule. The lens holder has an outside diameter that is substantially equal to 2.5 millimeters.

Thus, the invention achieves the objectives set forth above. The invention provides a device which includes expanded beam technology, yet is mateable with or connectable to receptacles or adapters where the receptacles or adapter were designed to accommodate physical contact, single fiber, fiber optic connectors such as LC, SC, FC, and ST style fiber optic connectors. Also, the expanded beam connectors of the invention provide a greater resistance to contamination than the physical contact fiber optic connectors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENTS

Figure 1:
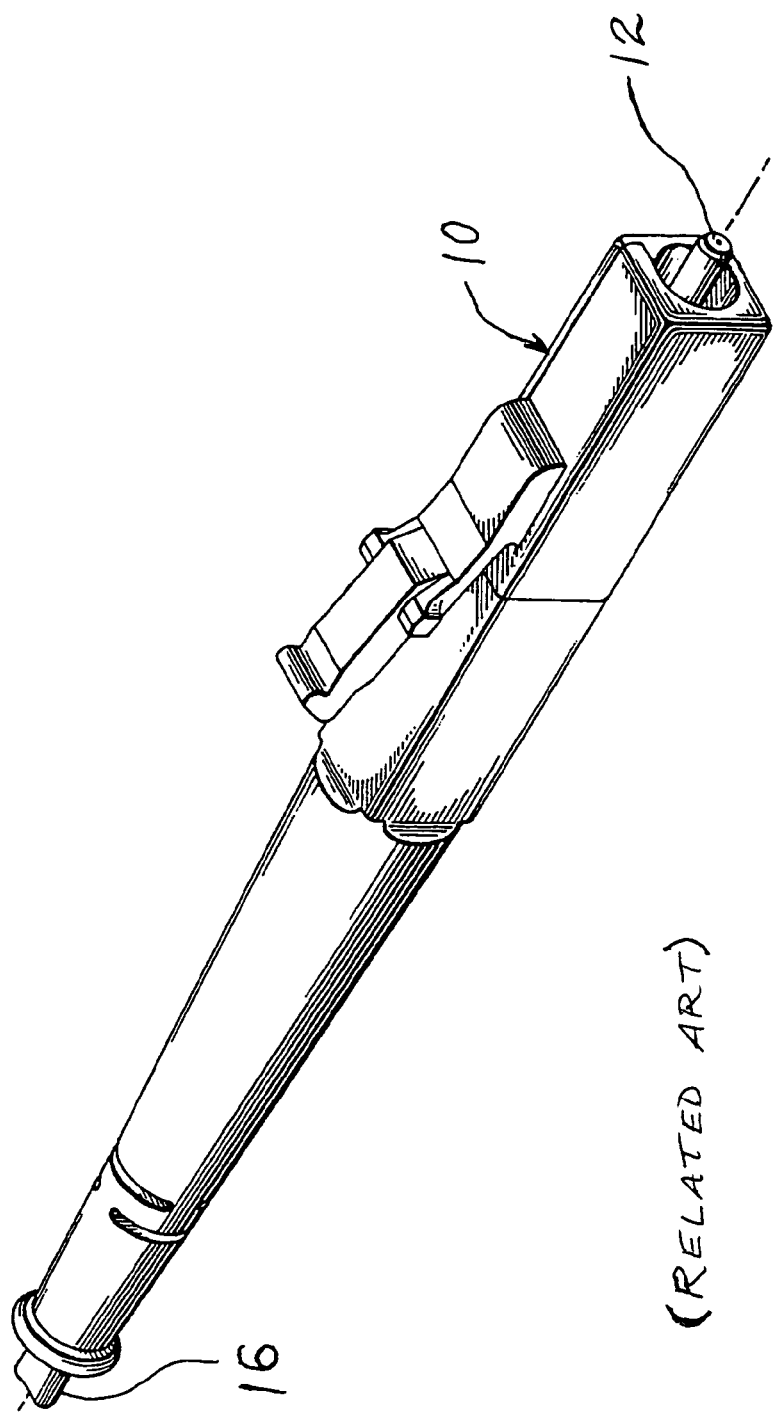
FIG. 1 is a perspective view of one type of a known physical contact, single fiber, fiber optic connector.
Figure 2:
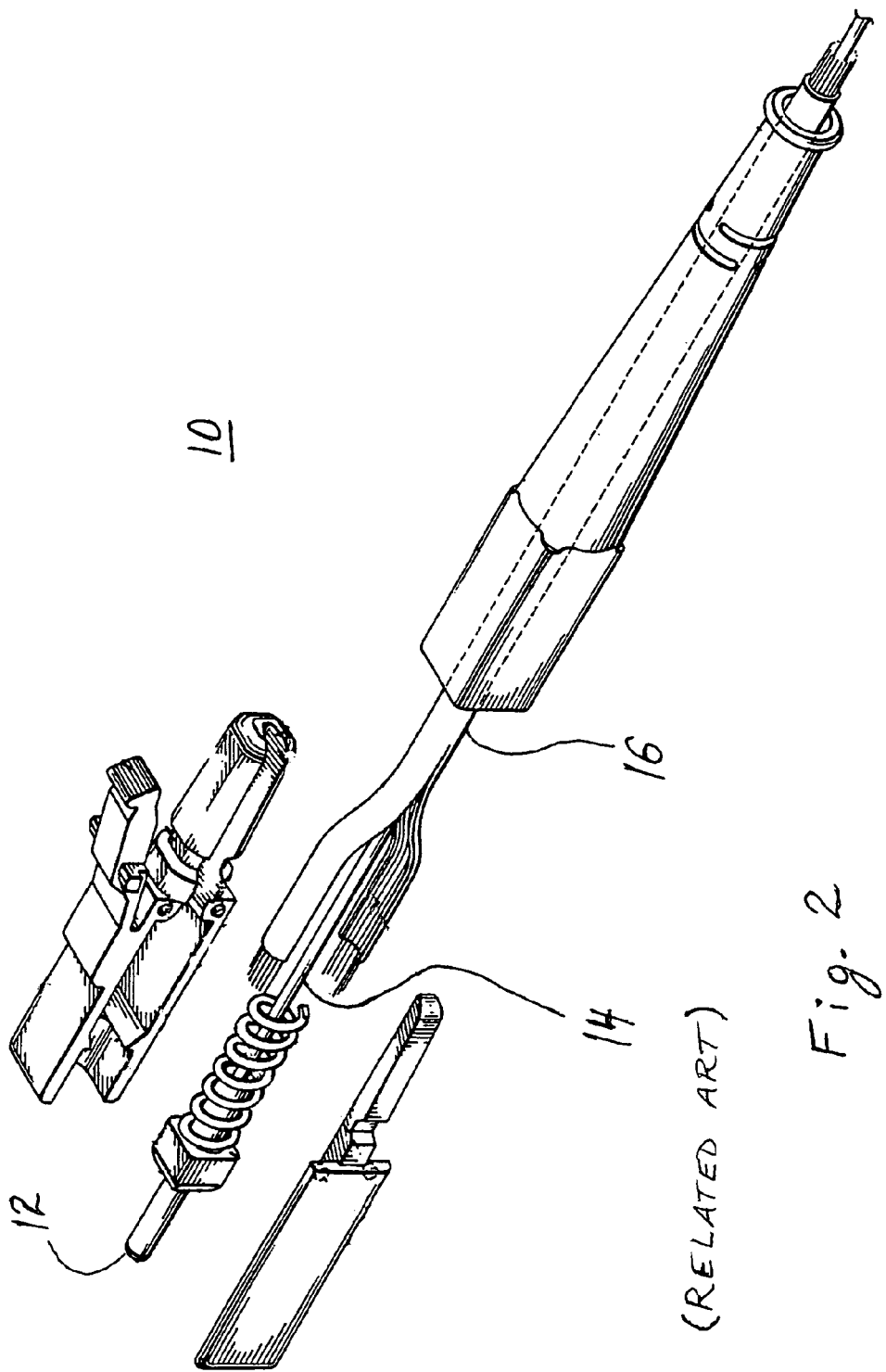
FIG. 2 is an exploded, perspective view of the known fiber optic connector of FIG. 1.
Figure 3:
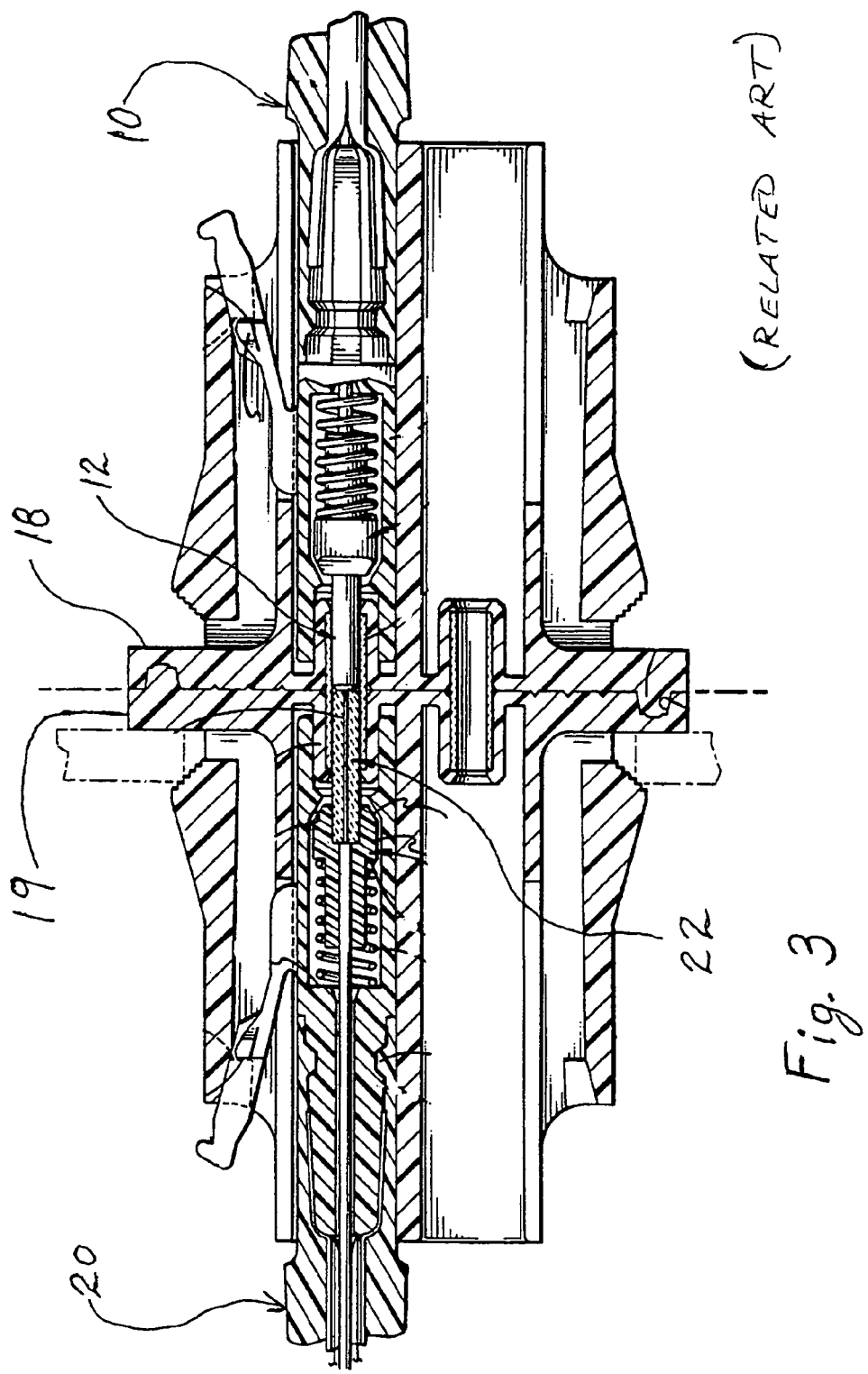
FIG. 3 is a partial cross-sectional side view of a known assembly which includes the known physical contact, fiber optic connector of FIG. 1 and another physical contact, fiber optic connector and two receptacles, where each of the physical contact, fiber optic connectors are positioned so as to enable optical communication between each of the two physical contact, fiber optic connectors.

Referring now to the drawings, wherein like reference numerals designate identical or corresponding parts throughout the several views, and more particularly to FIGS. 7-10, 12, and 14 thereof, an embodiment of the present invention is a device or expanded beam, single fiber, fiber optic connector 50 which is displayed therein.

Figure 7:
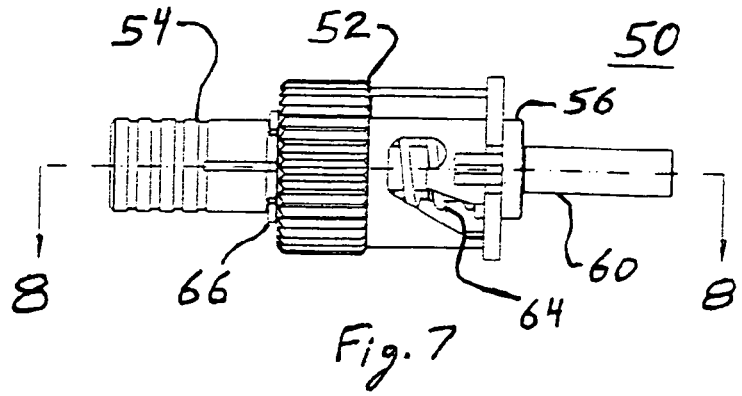
FIG. 7 is a side view of the expanded beam, single fiber, fiber optic connector of the invention.
Figure 8:
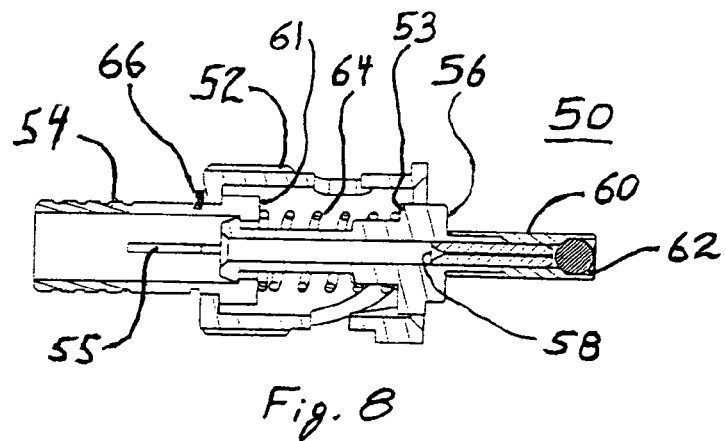
FIG. 8 is a cross-sectional side view of the expanded beam, single fiber, fiber optic connector of FIG. 7.
Figure 9:
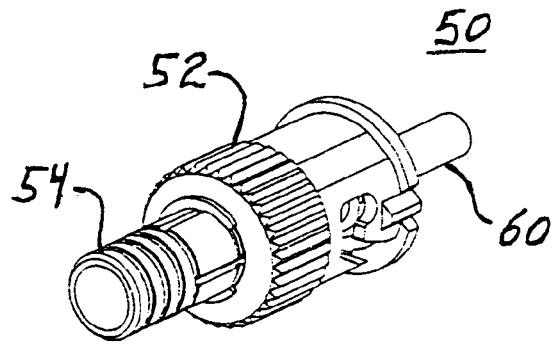
FIG. 9 is a perspective view of the expanded beam, single fiber, fiber optic connector of FIG. 1.

FIG. 7 is a side view of the device or expanded beam, single fiber, fiber optic connector 50. The device 50 includes a body 52, an optical cable holder 54, a spring 64, a lens holder 60, a lens 62 (see FIG. 8), a ferrule holder 56, a ferrule 58 (see FIG. 8), and a snap ring 66. FIG. 8 is a cross-sectional side view of the device 50 taken along section line 8-8 of FIG. 7. FIG. 9 is a perspective view of the device 50.

Figure 12:
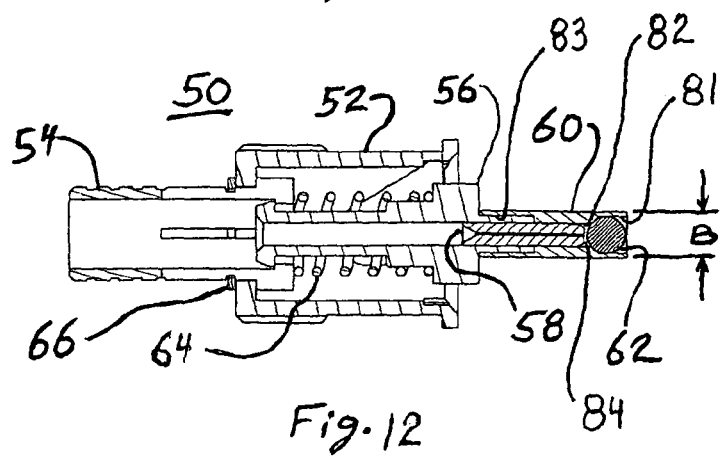
FIG. 12 is a cross-sectional side view of the device of FIG. 8 rotated approximately ninety degrees.

The lens holder 60 has an outside diameter identified by alphabetic character B (see FIG. 12). The lens holder 60 has a first aperture 81, a second aperture 82, and a third aperture 83. The apertures 81, 82, 83 are shown as cross-sectional side views. The first aperture 81 has an inside diameter, the second aperture 82 has an inside diameter, and the third aperture 83 has an inside diameter. The inside diameter of the first aperture 81 is greater than the inside diameter of the second aperture 82. The inside diameter of the first aperture 81 is greater than the inside diameter of the third aperture 83. The inside diameter of the third aperture 83 is greater than the inside diameter of the second aperture 82. The first aperture 81 is substantially co-linear with the second aperture 82, and the second aperture 82 is substantially co-linear with the third aperture 83. The lens holder 60 can be made of a metallic material, a polymer material, or any other suitable engineering material.

The lens 62 is a spherical ball lens which can be made of glass, plastic, sapphire, or other suitable engineering material. The lens 62 is mounted in the first aperture 81 of the lens holder 60. The lens 62 has an outside diameter that is less than the inside diameter of the first aperture 81 of the lens holder 60. The lens 62 can be retained in the lens holder 60 by way of an optically transparent epoxy, a snap ring, or other suitable retention method. As shown in FIG. 12, the lens 62 can rest against the ledge formed at the transition between the first aperture 81 and the second aperture 82 of the lens holder 60. The lens 62 is separated from the ferrule 58 by a gap 84, as shown in FIG. 12.

The ferrule holder 56 has an outside diameter and an inside diameter. The outside diameter of the ferrule holder 56 is less than the inside diameter of the third aperture 83 of the lens holder 60. The inside diameter of the ferrule holder 56 is greater than the outside diameter of the ferrule 58. The ferrule 58 is retained within the ferrule holder 56 with an epoxy material or other suitable retaining method or structure. The ferrule holder 56 is made of a metallic material, a polymer material, or other suitable engineering material. The ferrule 58 is made of a ceramic material, a polymer material, or other suitable engineering material. The ferrule holder 56 is mounted to the lens holder 60 at the interface between the outside diameter of the ferrule holder 56 and the inside diameter of the third aperture 83 of the lens holder 60 by way of an epoxy material or other suitable engineering material.

The optical cable holder 54 includes multiple slots 55, a snap ring groove 65 (see FIG. 10), and an aperture. The optical cable holder 54 is made of a metallic material, a polymer material, or other suitable engineering material. The spring 64 is a helical compression spring. The spring 64 and the snap ring 66 are made of a metallic material or other suitable engineering material based on their respective applications.

Figure 10:
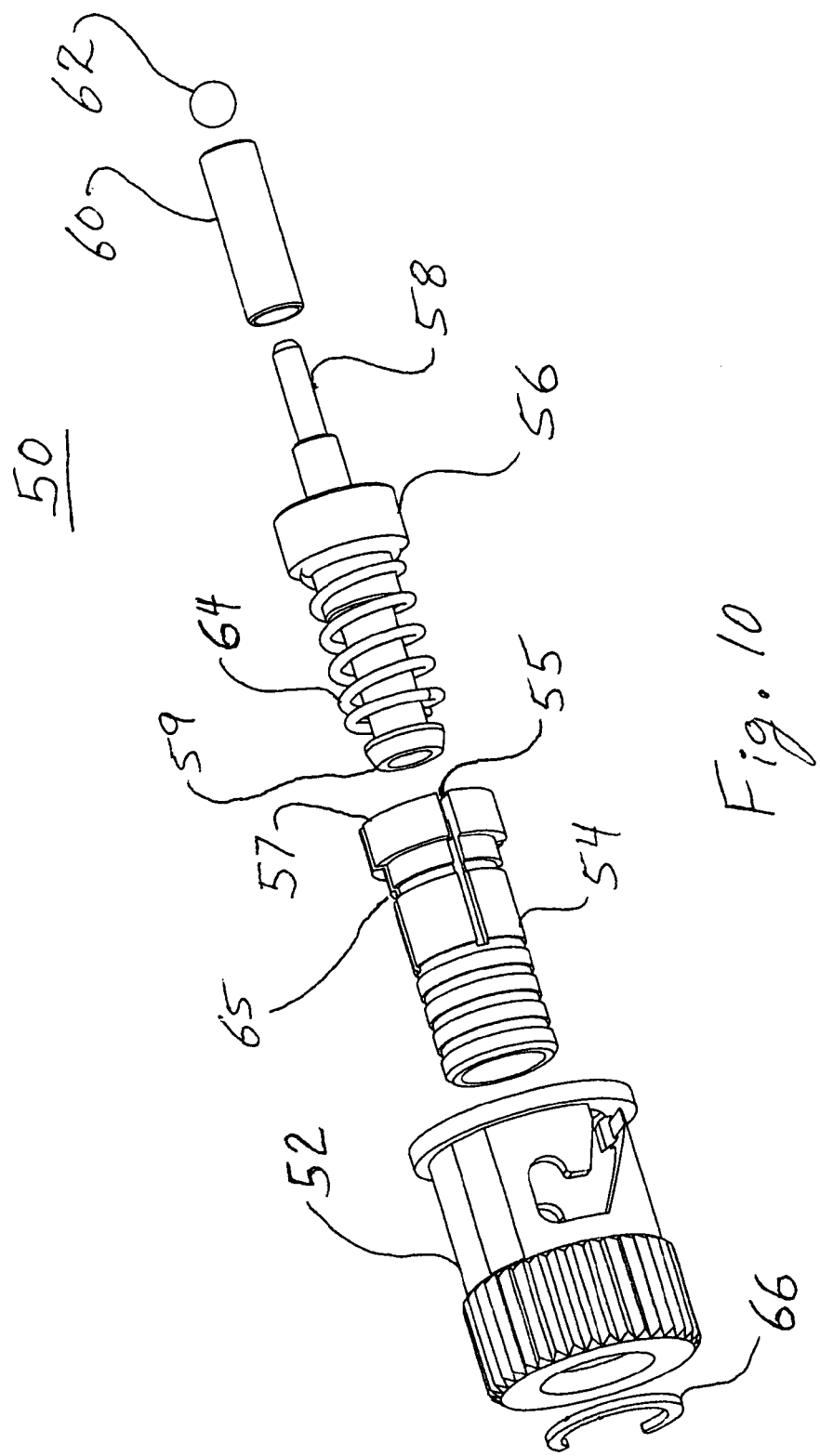
FIG. 10 is an exploded, perspective view of the expanded beam, single fiber, fiber optic connector of FIG. 9.

FIG. 10 is an exploded perspective view of the device 50 and will be used to illustrate the assembly of the device. The lens 62 is assembled with the lens holder 60. The ferrule 58 is assembled with the ferrule holder 56. The ferrule holder 56 is then assembled with the lens holder 60. The spring 64 is then assembled over the ferrule holder 56 so that one end of the spring sets against a spring seat 53 of the ferrule holder 56 (see FIG. 8). The chamfered end 59 of the ferrule holder 56 is introduced into the split end 57 of the optical cable holder 54 so as to cause the split end 57 to deflect along the multiple slots 55. Once the chamfered end 59 of the ferrule holder 56 is far enough into the aperture of the optical cable holder 54, the split end 57 and the slots 55 of the optical cable holder 54 deflect back to their undeformed positions and surround the chamfered end 59 of the ferrule holder 56, thus retaining the ferrule holder 56/lens holder 60 subassembly, and the spring 64 is retained between the spring seat 53 of the ferrule holder 56 and a spring seat 61 of the optical cable holder 54 (see FIG. 8). The assembly of the optical cable holder 54/spring 64/ferrule holder 56/lens holder 60 is then introduced into the body 52 until the snap ring groove 65 passes through the other side of the body 52. The snap ring 66 is then placed in the snap ring groove 65 of the optical cable holder 54, thus retaining all of the components to the body 52. The snap ring 66 also helps to prevent the split end 57 of the optical cable holder 54 from deflecting.

In use, the sheathing of optical cable (not shown) is terminated in the optical cable holder 54, and the optical fiber (not shown) within the optical cable (not shown) is terminated in the ferrule 58 before the ferrule 58 is assembled with the ferrule holder 56. For reasons of clarity, the optical fiber is not shown.

Figure 4:
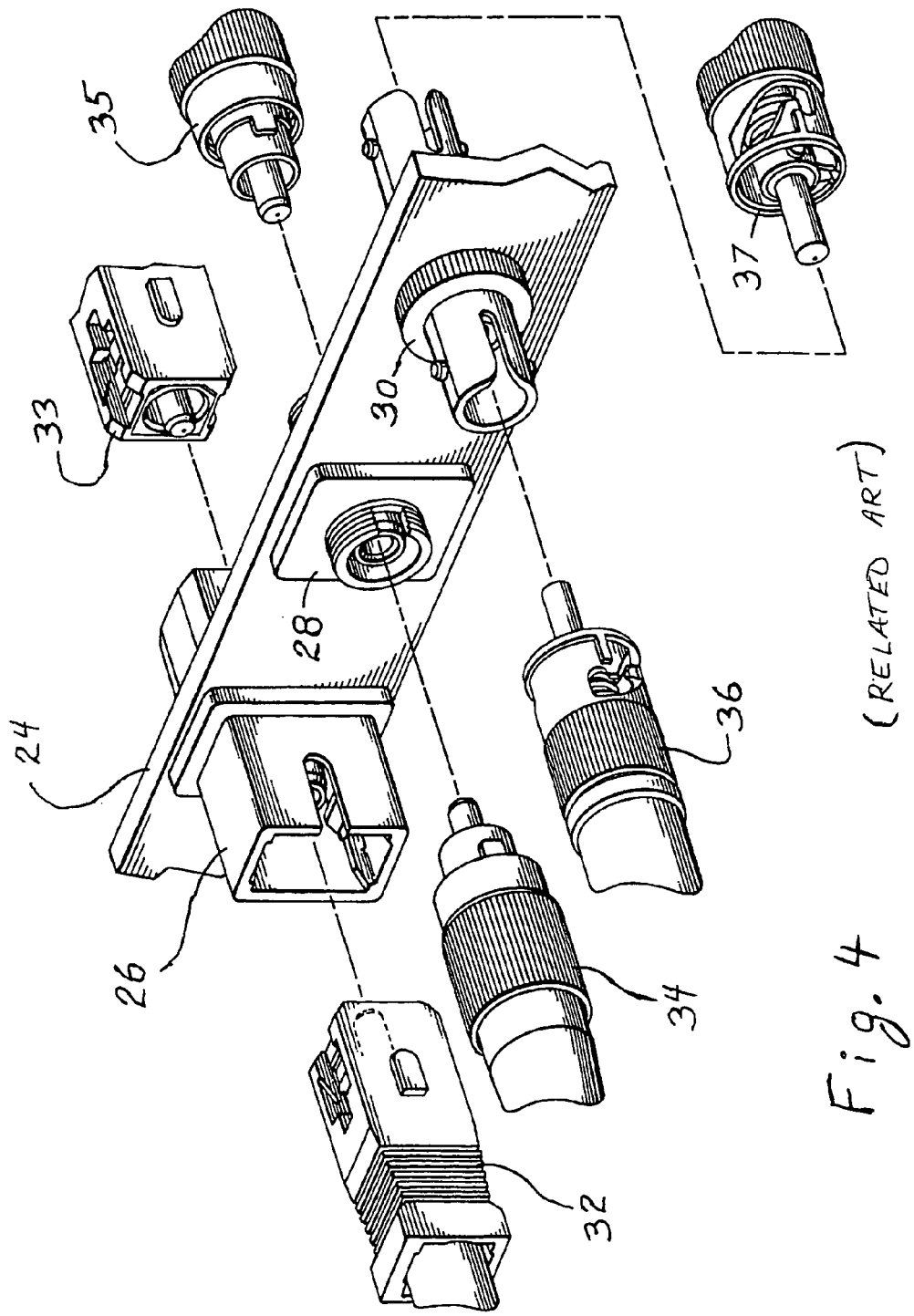
FIG. 4 is a perspective view of three different types or styles of known physical contact, single fiber, fiber optic connectors.
Figure 5:
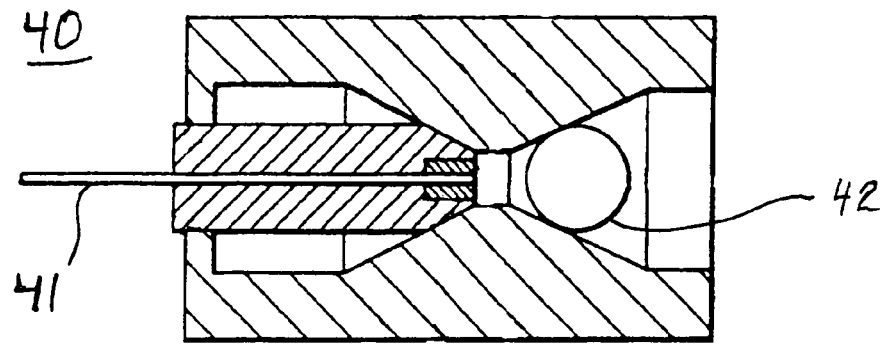
FIG. 5 is a cross-sectional side view of a known expanded beam, fiber optic connector.
Figure 6:
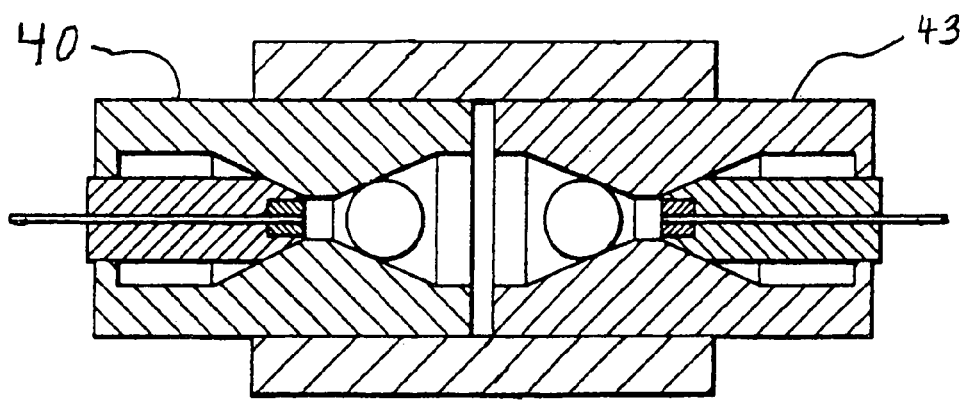
FIG. 6 is a cross-sectional side view of a known assembly which includes the known expanded beam, fiber optic connector of FIG. 5 and another expanded beam, fiber optic connector where each of the expanded beam, fiber optic connectors are positioned so as to enable optical communication between each of the two expanded beam, fiber optic connectors.

The device 50 shown in FIGS. 7, 8, 9, 10, 12, and 14 conforms to the ST industrial standard. The outside diameter B (see FIG. 12) of the lens holder 60 is substantially equal to 2.5 millimeters. Thus, the device 50 is an expanded beam substitute for the physical contact ST connectors 36, 37 disclosed in FIG. 4 and is thus capable of plugging into the receptacle 30 disclose in FIG. 4. Though, the ST style connector is shown in FIGS. 7, 8, 9, 10, 12, and 14, other connector styles can utilize the concept of this invention such as the SC, FC, and LC style or industrial standards. The SC and FC styles utilize a ferrule having an outside diameter substantially equal of 2.5 millimeters, and the LC style utilizes a ferrule having an outside diameter substantially equal to 1.25 millimeters.

Figure 11:
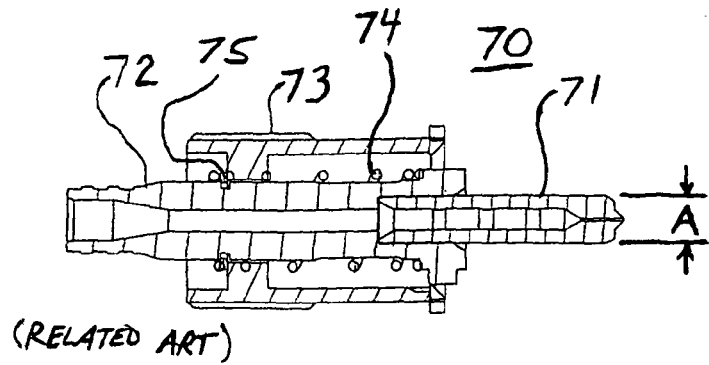
FIG. 11 is a cross-sectional side view of a physical contact, single fiber, fiber optic connector.
Figure 13:
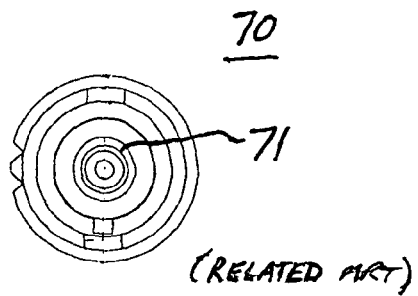
FIG. 13 is an end view of the physical contact, single fiber, fiber optic connector of FIG. 11 while looking at the end that contains the ferrule.

As another comparison between the physical contact connector and the expanded beam connector, FIG. 11 is a side cross-sectional view of the physical contact, single fiber, fiber optic connector 70. The fiber optic connector 70 is the same as the ST connectors 36, 37 disclosed in FIG. 4. The fiber optic connector 70 includes a ferrule 71 having an outside diameter substantially equal to 2.5 millimeters and is identified by alphabetic character A. The fiber optic connector 70 includes a cable holder 72, a spring 74, and a body 73. The ferrule 71 is mounted to the cable holder 72 and the spring 74 is interposed between the cable holder 72 and the body 73. The cable holder 72 is retained to the body 73 with a snap ring 75. When the ferrule 71 makes physical contact with another ferrule, the ferrule 71 transmits the force to the cable holder 72 which in turn deflects the spring 74. Thus, both the ferrule 71 and the cable holder 72, to which it is connected, translate. Due to the construction of the device 70, the ferrule 71 can not accommodate angular misalignments, or provide for strain relief of the optical fiber. FIG. 13 is an end view of the physical contact, fiber optic connector 70 taken while looking at the end which contains the ferrule 71.

Figure 14:
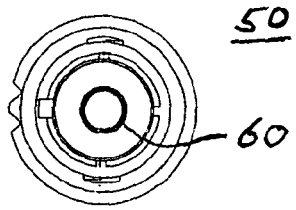
FIG. 14 is an end view of the device of FIG. 12 while looking at the end which contains the lens.

As a comparison, FIG. 12 is a cross-sectional side view of the device 50 of FIG. 8 rotated approximately ninety degrees. The outside diameter B of the lens holder 60 is substantially equal to 2.5 millimeters, since the device 50 is to be able to be inserted and accepted by a receptacle designed for a convention physical contact ST connector. The design of the device 50 does not only provide the advantages of expanded beam technology, the device 50 provides strain relief or the ability to accept angular misalignment as is explained below. When the device 50 is inserted into the receptacle 30 (see FIG. 4), the lens holder 60/ferrule holder 56 deflects the spring 64. However, unlike the physical contact connector 70 disclosed in FIG. 11, the optical cable holder 54 does not translate, it essentially remains still. Thus, the chamfered end 59 of the ferrule holder 56 moves closer to the snap ring 66 therefore the chamfered end 59 of the ferrule holder 56 lifts off of the surface provided by the split end 57 of the optical cable holder 54. In such a scenario, the lens holder 60/ferrule holder 56 translates and rotates separate from the optical cable holder 54 and the body 52. FIG. 14 is an end view of the device 50 taken while looking at the end which contains the lens holder 60.

Obviously, numerous modifications and variations of the present invention are possible in light of the above teachings. It is therefore to be understood that within the scope of appended claims, the invention may be practiced otherwise than as specifically described herein.

The invention claimed is:

1. A connector comprising:
a body;
a lens holder having an outside diameter, a first aperture, a second aperture, and a third aperture, the first aperture has an inside diameter, the second aperture has an inside diameter, the third aperture has an inside diameter, the first aperture is substantially co-linear with the second aperture, and the second aperture is substantially co-linear with the third aperture, the inside diameter of the first aperture is greater than the inside diameter of the second aperture, the inside diameter of the first aperture is greater than the inside diameter of the third aperture, and the inside diameter of the third aperture is greater than the inside diameter of the second aperture;
a lens mounted within the first aperture of the lens holder, the lens is a spherical ball lens, the lens has an outside diameter, and wherein the inside diameter of the first aperture of the lens holder is greater than the outside diameter of the lens;
a ferrule mountable within the lens holder, the ferrule having an outside diameter, and wherein the inside diameter of the second aperture of the lens holder is greater than the outside diameter of the ferrule;
a ferrule holder moveably mounted to the body, and the ferrule holder mountable to the lens holder and to the ferrule, the ferrule holder having an outside diameter and an inside diameter, the ferrule holder having a spring seat, and wherein the inside diameter of the third aperture of the lens holder is greater than the outside diameter of the ferrule holder, and wherein the inside diameter of the ferrule holder is greater that the outside diameter of the ferrule;
an optical cable holder having a spring seat;
an epoxy material at an interface between the outside diameter of the ferrule holder and the inside diameter of the third aperture of the lens holder so as to mount the ferrule holder to the lens holder;
a snap ring mounted to the optical cable holder so as to retain the optical cable holder to the body; and
a spring mounted between the spring seat of the ferrule holder and the spring seat of the optical cable holder, the spring is a compression spring, wherein the spring is retained between the spring seat of the ferrule holder and the spring seat of the optical cable holder by the snap ring.

* * * * *